May 5, 1964 G. J. GIEL 3,132,256
MAGNETIC PULSE AMPLITUDE TO PULSE LENGTH CONVERTER SYSTEMS
Filed Oct. 3, 1960 2 Sheets-Sheet 1

George J. Giel
INVENTOR.

BY Byard G. Nilsson

ATTORNEY

George J. Giel
INVENTOR.

United States Patent Office

3,132,256
Patented May 5, 1964

3,132,256
MAGNETIC PULSE AMPLITUDE TO PULSE
LENGTH CONVERTER SYSTEMS
George J. Giel, Los Angeles, Calif., assignor to Electro-
Logic Corporation, Venice, Calif., a corporation of
California
Filed Oct. 3, 1960, Ser. No. 59,873
9 Claims. (Cl. 307—88)

The present invention relates to a signal converter for changing the form of signal-represented information, and particularly to a system for providing a time interval representative of the amplitude of a received analog signal.

Many different types of transducers are variously employed to sense physical phenomena and manifest information in the form of an electrical signal. The signal from many transducers is in analog form, that is, the signal is amplitude-modulated to represent the degree or intensity of the observed physical phenomena. In general, apparatus employing analog signals must be very precisely constructed to obtain acceptable accuracy in combining and manipulating these signals. Therefore, it is somewhat common practice to convert analog signals (from transducers) into digital signals which may be more accurately manipulated and combined. In general, analog-to-digital converters have taken the form of complex and expensive apparatus. Furthermore, additional expensive apparatus is often required to amplify and preserve analog signals prior to conversion to digital form.

The difficulty in preserving and handling analog signals results because these signals are amplitude modulated. That is, of the various aspects of an electrical signal, the amplitude is one of the most difficult to reproduce and preserve. One aspect of an electrical signal which can be precisely controlled and reproduced is the duration of a pulse. It has been previously proposed to represent information by pulse duration and this technique has been termed "pulse-width modulation."

In general, the present invention comprises an apparatus for accurately converting an analog signal into a pulse-width modulated signal. To accomplish this conversion, a magnetic member is employed which has a magnetic saturation level and considerable magnetic retentivity. Magnetizing means are then provided to establish the magnetic member at the saturation level which becomes a reference level of magnetism. The magnetizing means then vary the magnetism of the magnetic element away from the saturation level during a precise time interval in accordance with the amplitude of the analog signal. The magnetism of the magnetic element is then returned to the saturation level and means are provided for sensing the interval required to accomplish this change. This interval is then representative of the analog signal and may be conveniently transmitted and accurately preserved.

An object of the present invention is to provide an improved apparatus for converting electrical signals from one form to another.

An other object of the present invention is to provide an electrical signal converter, which may be simply and inexpensively constructed to accurately change the form of electrical signals.

Still another object of the present invention is to provide an improved signal converter employing the characteristics of a magnetic element to translate analog signals into pulse-duration signals by employing a medium having a residual state as a magnetic material.

These and other objects of the present invention will become apparent from a consideration of the following, taken in conjunction with the referenced drawings, wherein.

The present invention employs an element of magnetic material to accomplish the desired conversion. Customarily, magnetic materials are defined by their hysteresis loop, which is a plot of flux density along the vertical axis versus magnetizing force along the horizontal axis. An exemplary hysteresis loop is shown in FIGURE 1 and will be considered preliminary to the description of exemplary embodiments of the present invention.

Figure 1:
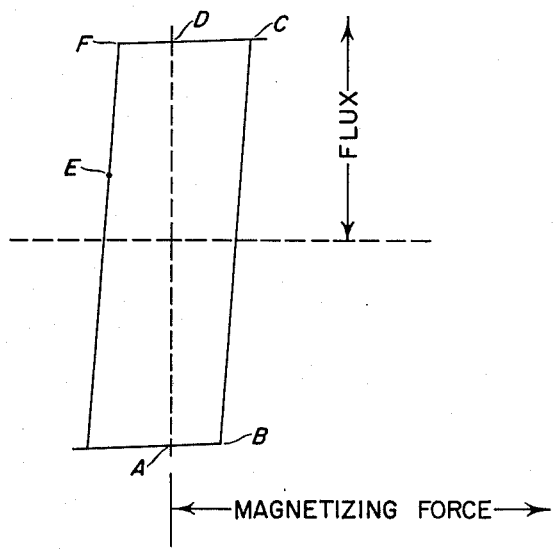
FIGURE 1 is a graphical presentation of the hysteresis characteristic of a magnetic material which may be employed in one form of the present invention.

The hysteresis loop of FIGURE 1 has a substantially-rectangular form. That is, if a strong magnetizing force is applied to the material described by the loop of FIGURE 1, the material saturates and very little change in flux is accomplished by further increasing the magnetizing force. Furthermore, upon removal of the magnetizing force, the flux or magnetization of the material changes by a very small amount as the magnetizing force drops to zero.

Considering the illustrated hysteresis loop, the transition from one level of saturation to another occurs at a threshold level of magnetizing force, defined by the hysteresis loop, i.e. the threshold level of magnetizing force indicated at the knee of the loop which is being approached. Therefore, to alter the flux or magnetism of a magnetic material (defined by the loop of FIGURE 1) it is necessary to apply a magnetizing force adequate to magnetically drive the material beyond the threshold (knee of the curve) for a sufficient time to permit the core to change from one state to the other. It is to be noted, that the interval required for this change varies inversely as the intensity of the magnetizing force.

Assuming that a magnetic element under consideration is residually magnetized at level A (negative saturation) and that a magnetizing force is applied which is greater than that indicated by the knee B, the magnetism of the element will start to change toward the state indicated at the level C (positive saturation). However, the rate at which the magnetism changes from the negative saturation level A to the positive saturation level C is dependent upon the strength of the magnetizing force.

The magnetizing force represents electrical power and the consumption of power over the interval required to change a magnetic element from one saturation level to another is indicated by the product of power and time, or energy. These considerations lead to the well-known fact that a magnetic element (as described by the hysteresis loop of FIGURE 1) requires a precise amount of energy to undergo the transformation from one saturation level to the other saturation level. In this regard, the direction of the magnetic change is somewhat immaterial, so that substantially the same energy is required in altering the magnetism of a given element from either saturation level to the other.

Assuming a change in the magnetism of an element from the positive saturation level to the negative saturation level requires power $P_1$ for time $T_1$, and the change from the negative saturation level to the positive saturation level requires energy of power $P_2$ for a time interval $T_2$, the above-described equality may be mathematically expressed as an energy equation:

$$P_1T_1 = P_2T_2$$

These considerations apply not only to a complete transition from one saturation level to the other, but also to partial transitions. For example, assume a magnetic element is residually magnetized at the level D as indicated in FIGURE 1. Assume further that a magnetizing force (power) is applied to the element for a time interval sufficient to drive the magnetism of the element to the point E. This operation would require a predetermined amount of energy, say $P_eT_e$.

To return the magnetic state to the saturation level D, requires an amount of energy designated $P_dT_d$, which substantially coincides to the energy $P_eT_e$. That is, ideally $P_eT_e = P_dT_d$.

In general, the present invention utilizes the above relationship of time and power in the conversion of analog amplitude-representative signals into time-modulated, or pulse-duration-modulated signals. This operation is performed by maintaining the set interval $T_e$ constant and applying an analog signal (represented by $P_e$) to magnetize the element at some point removed from the saturation level. The element is then returned to the saturation level during a variable interval $T_d$ by a constant magnetizing force (power) $P_d$. Therefore, the variable time interval $T_d$ is proprtional to the variable signal input $P_e$ and the conversion relationship is established.

Figure 2:
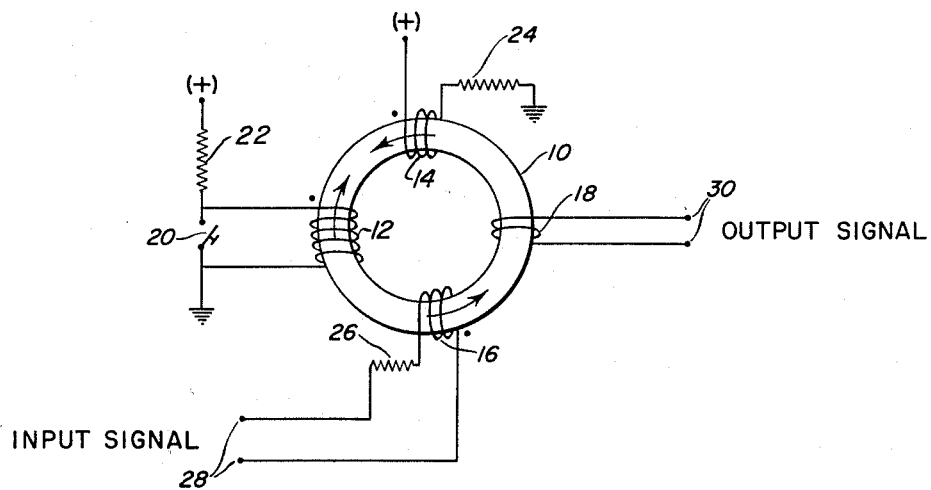
FIGURE 2 is a schematic diagram of a preliminary embodiment of the structure for the present invention.

In view of the above preliminary consideration, reference will now be had to FIGURE 2 which shows a preliminary form of the invention. FIGURE 2 shows a magnetic core 10 in toroidal form which is made of material having a hysteresis characteristic as shown in FIGURE 1 with substantial residual magnetism. The core 10 may be made of different magnetic materials including ceramic ferrite, and bobbin-wound magnetic tape.

Windings 12, 14 and 16 are disposed upon the core 10 so as to magnetize or drive the core by the electromagnetism resulting from the current in each winding. The winding 12 is connected in parallel with a manually-operated normally-open switch 20. The winding 12 and the switch 20 are then connected in series with a current-limiting resistor 22 and the complete circuit is connected between a source of positive potential and ground. The winding 12 serves to create a magnetic field in the direction indicated by the arrow adjacent the winding 12.

The winding 14 is connected in series with a resistor 24 and the combination is connected between a source of positive potential and ground. The winding 14 serves to magnetize the core 10 in the direction indicated by the arrow adjacent the winding 14.

The winding 16 is serially connected with a resistor 26 across terminals 28 which are provided to receive an analog signal that is to undergo conversion. The energization of the winding 16 results in flux in the core as indicated by the arrow adjacent the winding 16, i.e. aiding the flux of the winding 14 and opposing the flux of the winding 12.

A winding 18, also mounted on the core 10, is connected across terminals 30 to provide the output signal from the converter which is induced in this winding upon the occurrence of flux changes in the core 10.

In operation, the windings 12, 14 and 16 are all energized during the quiescent interval to apply a composite magnetic driving force to the core 10. The driving force resulting from the winding 16 is proportional to the input analog signal. The driving force applied to the core 10 by the winding 14 is relatively constant and may be considered as a bias magnetizing force which aids the magnetizing force of the analog signal. The magnetizing force provided by the winding 12 is opposed to the other magnetizing forces, and is considerably stronger, so as to drive and hold the core 10 at a level of positive saturation although the other windings are energized. The saturation level of the core is a relatively stable state of magnetism and this persistent level of magnetism is substantially maintained as long as the force of the winding 12 is above some predetermined value.

Considering the operation of the structure of FIGURE 2 to accomplish a conversion, the switch 20 is closed after the core has been magnetized to positive saturation. Closure of the switch shunts the winding 12 so that no current flows through the winding 12 with the result that no magnetizing force is provided by the winding 12. The winding 14 then exerts a magnetizing force upon the core which (considered alone) drives the core substantially to the knee F (FIGURE 1). The magnetizing force provided by the winding 14 is aided by the magnetizing force of the winding 16, which is proportional to the analog signal. Therefore, the total applied magnetizing force drives the core from the persistent level of saturation downward at a rate dependent upon the amplitude of the analog signal undergoing conversion.

The interval during which the switch (FIGURE 2) is open is precisely-timed and is inadequate to permit the magnetism of the core 10 to reach negative saturation even when the analog signal is at its highest value. That is, during normal operation, the switch 20 is opened prior to the time when the core reaches negative saturation.

Opening the switch 20 results in the application of a strong, positive magnetizing force from the coil 12 to drive the core back to the positive saturation level. At the instant the switch 20 is opened, the flux in the core begins to change toward positive saturation, and the interval required for the core to attain saturation depends upon the extent of the excursion away from the positive saturation.

During the interval that the core is returned to positive saturation, the flux in the core undergoes change, and a voltage is induced in the winding 18 which appears across the output terminals 30. Therefore, beginning at the instant the switch 20 is closed, a voltage appears at the output terminals 30, which terminates when the core reaches positive saturation. When the core reaches positive saturation, the flux change in the core is very slight; therefore, no further significant voltage is induced in the winding 18 to be presented at the output terminals 30. Therefore, the interval of the voltage at the terminals 30 is proportional to the amplitude of the analog signal.

Thus, by providing a magnetizing force (representative of power) to the core 10 during a precise time interval, the signal represented by the magnetizing force is converted to a representative time interval by employing an unvarying magnetizing force to return the core to saturation.

Figure 3:
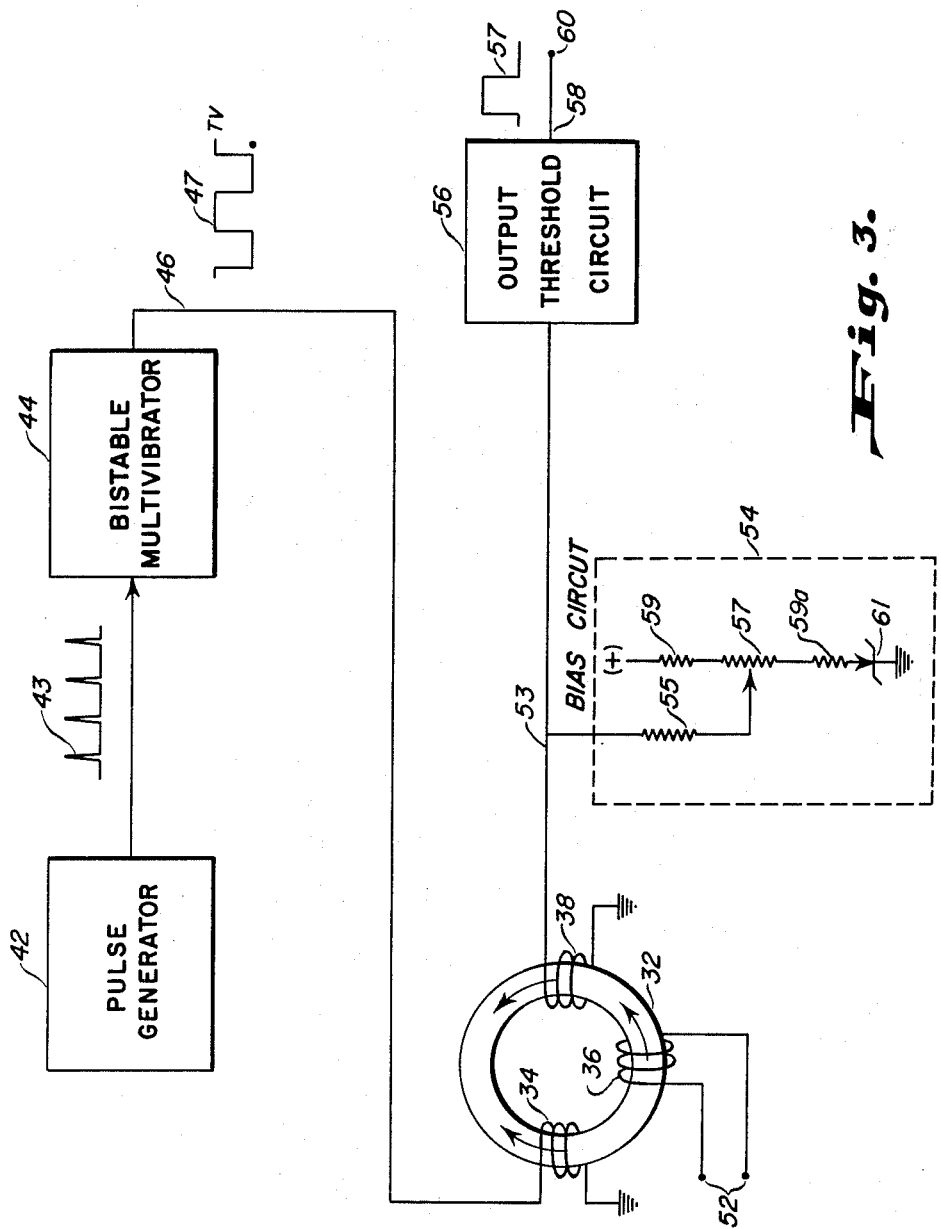
FIGURE 3 is a diagrammatic representation of another embodiment of the present invention.

Referring to FIGURE 3, there is shown another embodiment of the present invention. In FIGURE 3, a core 32 is provided with a saturating winding 34, an input winding 36 and a bias-output winding 38. The direction of the magnetizing force provided by each of these windings is indicated by the arrows adjacent the windings in accordance with the previously-adopted convention, that is, the magnetism of the windings 36 and 38 is opposed to that of the winding 34.

The basic operation of the core 32 is somewhat similar to that previously described. The winding 34 holds the core at the saturation level in the quiescent state. Then, during a set interval, the winding 34 is de-energized for a precisely-timed period to permit the windings 36 and 38 to alter the magnetization of the core 32 down the hysteresis loop by an amount proportional to the input signal. At the termination of the measured time interval, the winding 34 is again energized to provide a magnetizing force which is very high relative to the combined magnetizing forces from the windings 38 and 36. Thereupon, the magnetization of the core 34 ascends to the saturation level during a conversion interval which varies as the extent to which the windings 36 and 38 drove the core away from the saturation level. This time interval is manifest by a voltage induced in the winding 38, which essentially has a duration proportional to the input signal.

Considering the system of FIGURE 3 in greater detail, the operating cycle is controlled by a pulse generator 42, which provides regularly-occurring impulses 43, and may take the form of various well-known stable pulse-oscillator circuits. The pulses 43, from the pulse generator 42, are voltage spikes some 40 milliseconds apart in one successful embodiment of the invention, and are applied to a bistable multivibrator 44. The multivibrator 44 may take the form of various two-state circuits, and alters its state upon receiving each of the pulses 43. The multivibrator 44 has an output through a conductor 46, which carries a two-state signal 47 varying between ground and positvie potential.

This two-state signal 47 controls the energization of the saturation winding 34, and thus the intervals during which the core 32 is set and reset. That is, during the period that the signal is at ground, no current flows through the winding 34 and the core 32 is set to a flux level proportional to the analog signal to be converted. This setting is affected by the bias and the analog signal applied at the input terminals 52. Then, during the high intervals of the signal 47, current flows through the winding 34 to reset the core 32, inducing the representative time-modulated pulse in the output winding 38.

The output voltage from the core 32 is to the bias-output winding 38 which has one terminal connected to ground, and the other connected through a conductor 53 both to a bias circuit 54 and an output circuit 56. The function of the bias circuit 54 is to provide a relatively constant current through the winding 38 which assures that the flux in the core 32 will exceed the knee of the hysteresis loop during the setting intervals.

The conductor 53 is connected through a resistor 55 in the bias circuit 54 to the variable element of a potentiometer 57 which is serially connected with resistors 59, 59a and a Zener diode 61 across a potential difference. The resistor 55 therefore limits a substantially constant current through the winding 38, which current is regulated by the diode. This current therefore provides a substantially-constant biasing magnetic force to the core 32.

The output circuit 56 (also connected to conductor 53) serves to isolate the output from the bias circuit 54, and receives the pulse voltage induced in the winding 38 to form a regular, rectangular pulse 57, which appears in the conductor 58. The conductor 58 is connected to an output terminal 60 providing time-modulated pulses representative of the analog signal. The output circuit may take the form of various well-known threshold circuits which provide a two-state output signal which is high as long as the input is above a threshold level.

Considering the operation of the system during an exemplary conversion, assume initially that a conversion interval has been completed. The multivibrator 44 is therefore in a state to provide a high voltage in the conductor 46. The high voltage in the conductor 46 results in a current through the winding 34 adequate to maintain the core 32 at positive saturation (arbitrarily assigned).

During this interval, the windings 36 and 38 are energized to produce magnetizing forces opposed to that of the winding 34; however, these forces are insignificant relative to the force of the winding 34, therefore, the core is held at positive saturation.

With the system in this state, the next pulse from the pulse generator 42 causes the voltage in the conductor 46 to drop to ground. Therefore, the winding 34 is connected across ground and no current flows. The core 32 now experiences magnetizing force from the winding 38 (to drive the core 32 to the knee of the hysteresis loop) and from the winding 36 (proportional to the analog signal undergoing conversion). Therefore, the flux in the core 32 drops (as to point E in FIGURE 1) by an amount proportional to the analog signal. This drop does not occur instantaneously but occurs over the interval that no current flows through the winding 34.

Current through the winding 34 is re-established upon the occurrence of the next pulse from the pulse generator 42, causing the voltage in the conductor 46 to go high. The high state of the voltage in the conductor 46 results in a current through the winding 34 to produce a magnetic driving force and return the core 34 to positive magnetic saturation.

As the flux of the core 32 increases, traversing the hysteresis loop from a point as E in FIGURE 1, back to positive saturation, a voltage is induced in the bias-output winding 38 which is applied to the output circuit 56 to be formed into a well-defined pulse, the duration of which is indicative of the amplitude of the analog signal.

At the time when the core 32 reaches saturation, no further significant voltage is induced in the winding 38 and the output circuit 56 discriminates against the small voltage which is induced after saturation, thereby defining the termination of the pulse which indicates the analog signal. However, the conversion interval for the system (as defined by the high state of the voltage in conductor 46) persists until the occurrence of another set interval. Thus, the system proceeds to function during alternate set and conversion intervals, alternately setting the state of the core 32 away from the saturation level by an amount proportional to the analog signal, and then returning the magnetic state of the core 32 to saturation with a relatively-constant driving force to provide a time interval indicative of the analog signal.

From a consideration of the above, it is apparent that an important feature of the present invention resides in the use of a magnetic material which is initially magnetized according to an analog signal as a result of application of power indicative of the signal during a precise time interval. The magnetic material is then caused to manifest a pulse having a duration indicative of the analog signal by applying a relatively constant-power signal to return the magnetic material to saturation, and observing the interval of flux change.

It should be noted that although the particular embodiments of the invention herein described are fully capable of providing the features and achieving the objects set forth, such embodiments are merely illustrative and this invention is not to be limited to the details of construction illustrated and described herein, except as defined by the appended claims.

What is claimed is:

1. A converter for providing a time interval representative of an analog signal, comprising: a retentive saturable magnetic member; magnetic driving means to drive said member for providing a magnetizing force representative of said analog signal; magnetic biasing means for providing a magnetizing force to drive said member substantially to the knee of the hysteresis curve; magnetic saturation means for providing a saturating magnetizing force opposed to that of said magnetic driving means and said magnetic biasing means, which saturating magnetizing force is adequate to drive said member to saturation opposing said magnetic driving means and said magnetic saturation means; timing means for providing a predetermined interval; switching means for rendering said magnetic saturation means inoperative during said predetermined interval while said magnetic driving means and said magnetic biasing means are operative; and means for manifesting the length of a period after said predetermined interval required by said saturation means to drive said member to saturation.

2. Apparatus according to claim 1 wherein said magnetic member comprises a toroid of material having a substantially rectangular hysteresis loop.

3. Apparatus according to claim 1 wherein said means for manifesting includes a conductor disposed adjacent to said member to receive an induced voltage during the period of driving said member to saturation.

4. A system for converting an amplitude-representative signal to a time-modulated pulse, comprising: a magnetic element having substantial retentivity, and which is flux-saturable as defined by a hysteresis curve; magnetic biasing means for providing a magnetizing force sufficient to exclusively drive said magnetic element substantially to the knee of said hysteresis curve; magnetic driving means for providing a magnetizing force to said element during a first interval which force is proportionate to said amplitude-representative signal; magnetic saturation means for driving said element other than during said first interval with a magnetic force opposed to that of said magnetic driving means and said magnetic biasing means, and sufficient to drive said element to flux-saturation; and output means operative other than during said first interval to sense, as an electrical pulse, the interval required for said magnetic saturation means to drive said element to saturation subsequent to said first interval.

5. Apparatus according to claim 4 wherein said magnetic biasing means comprises an individual winding affixed on said element, and means for providing a substantially-constant current in said winding.

6. Apparatus according to claim 4 wherein said output means comprises a winding on said element, and means for passing signals induced in said winding which exceed a predetermined level of amplitude.

7. Apparatus according to claim 6 wherein said magnetic biasing means comprises means for providing a substantially-constant current in said winding which is opposed to said signals induced in said winding.

8. A system for coverting an amplitude-representative signal to a time-modulated pulse, comprising: a magnetic element having substantial retentivity, and which is flux-saturable as defined by a hysteresis curve; magnetic driving means for continuously providing a magnetizing force to said element, which force is substantially proportionate to said amplitude-representative signal; magnetic saturation means for driving said element during a predetermined interval with a magnetic force opposed to that of said magnetic driving means and sufficient to overcome said magnetic force of said magnetic driving means and drive said element to flux-saturation; and output means operative subsequent to said predetermined interval to provide an output pulse representative of the interval required by said magnetic saturation means to return said element to flux-saturation.

9. Apparatus according to claim 8 further including biasing means for providing a continuous magnetizing force of the same sense as said magnetic driving means, and of an intensity to independently drive said element to the knee of said curve.

References Cited in the file of this patent
UNITED STATES PATENTS

| | | |
|---|---|---|
| 2,780,782 | Bright | Feb. 5, 1957 |
| 2,808,578 | Goodell | Oct. 1, 1957 |
| 2,875,412 | Kaplan | Feb. 24, 1959 |